Aug. 21, 1956  J. J. FOGLIO  2,759,291
FISHING APPARATUS
Filed Nov. 3, 1951  3 Sheets-Sheet 1
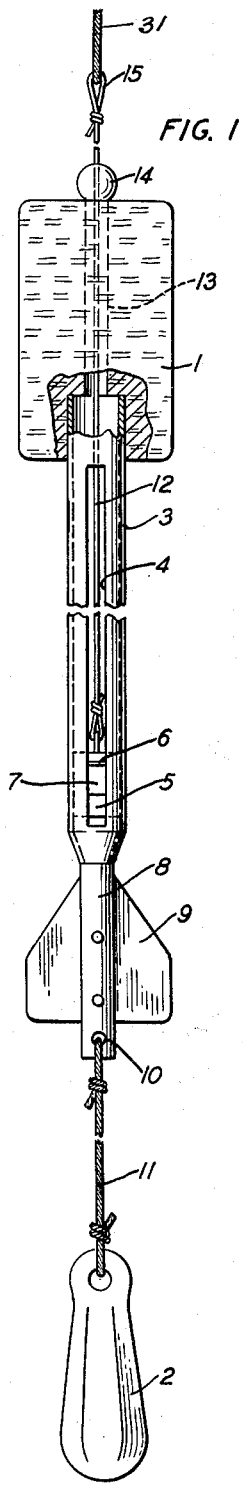
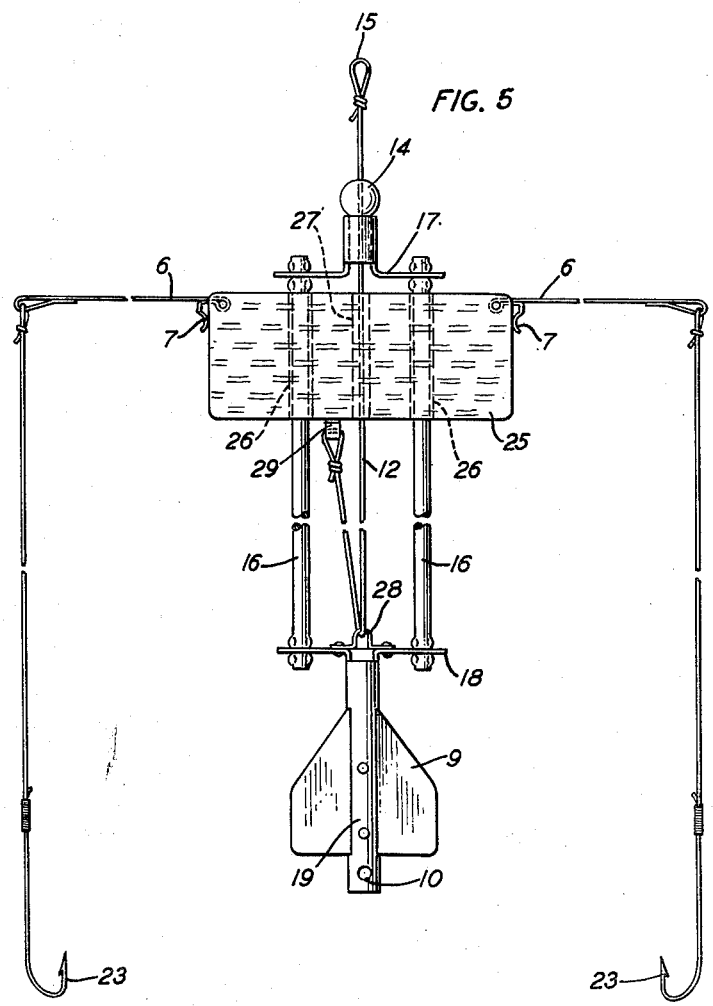
INVENTOR
JAMES J. FOGLIO
BY
ATTORNEY Aug. 21, 1956 J. J. FOGLIO 2,759,291
FISHING APPARATUS
Filed Nov. 3, 1951 3 Sheets-Sheet 2
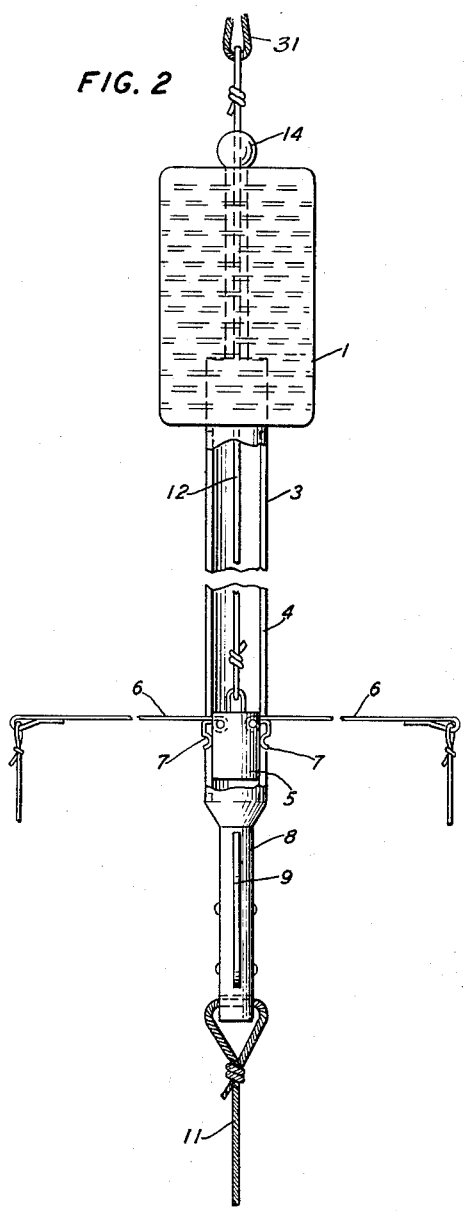
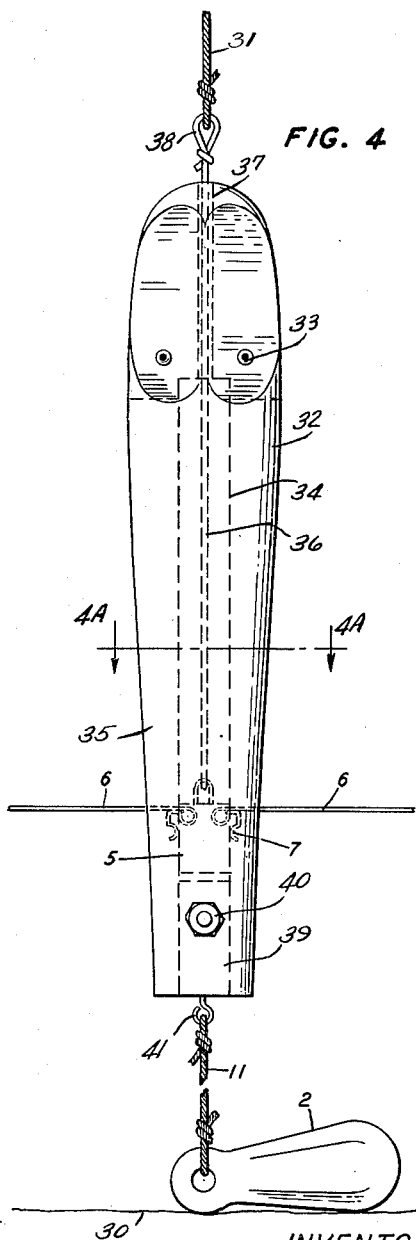
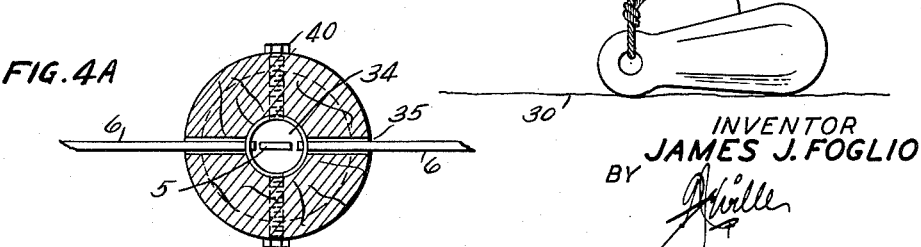
INVENTOR
JAMES J. FOGLIO
BY
ATTORNEY

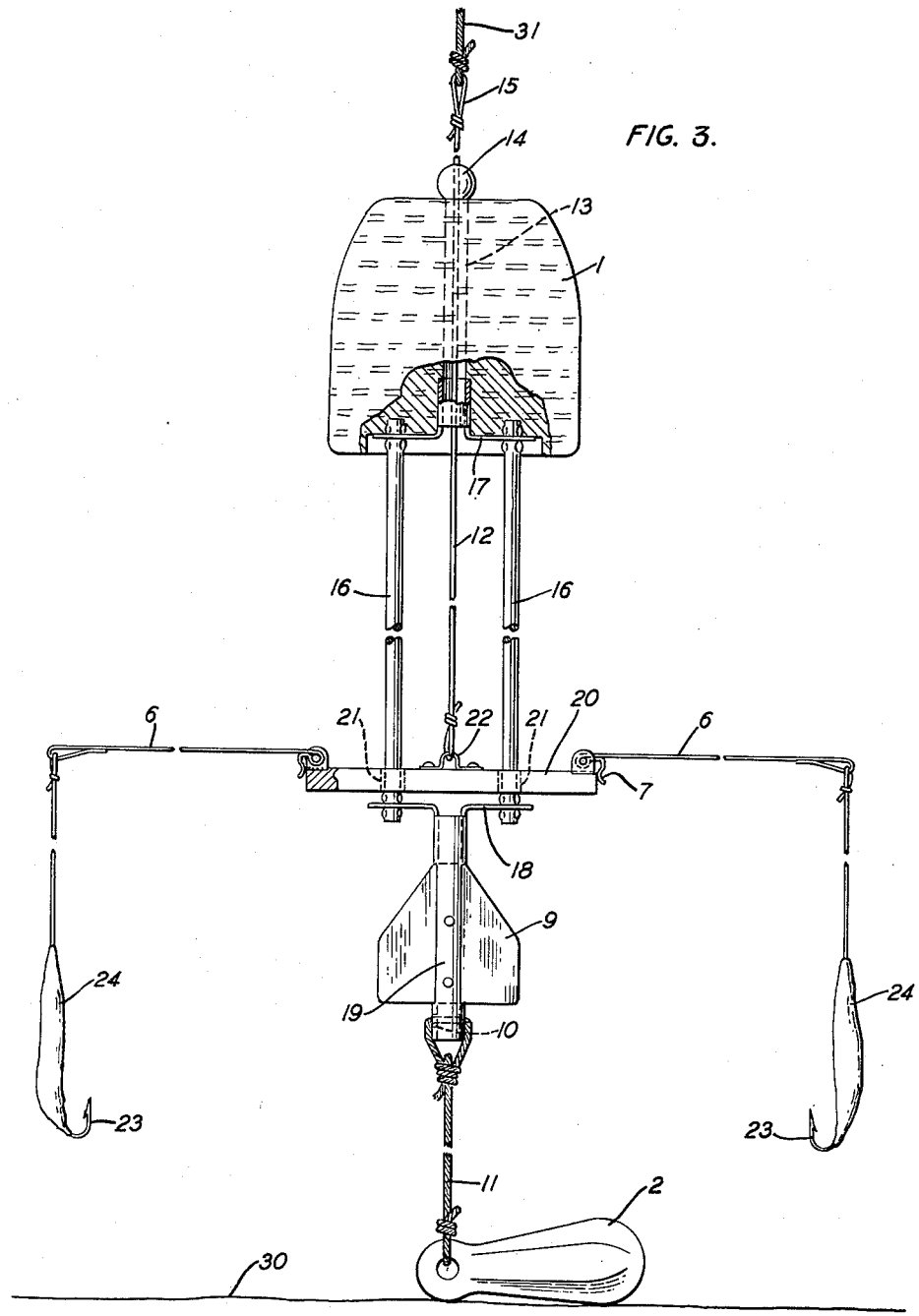

United States Patent Office 2,759,291
Patented Aug. 21, 1956

2,759,291

FISHING APPARATUS

James J. Foglio, New Rochelle, N. Y.

Application November 3, 1951, Serial No. 254,758

10 Claims. (Cl. 43—43.15)

This invention relates to a fishing tackle designed to support the fishing hook thereof at a predetermined depth above the bed of the water in accordance with the type of drop fishing, namely low, intermediate or surface, in which it is desired to engage, and simultaneously to permit a limited reciprocation thereof so as to attract fish.

The object of the invention is to position the body of the tackle at a predetermined distance from the bottom of the water being fished and to permit vertical movement of the fish hook or hooks between fixed limits without disturbing the position of the sinker attached to the tackle.

Still a further object is to provide a fishing tackle which will tend to occupy a vertical position in the water with one predetermined end uppermost.

Still a further object is to provide a fishing device supporting a plurality of fish hooks provided with means tending to prevent entanglement of the hooks even when the device is used for trolling.

I accomplish the foregoing and other objects of my invention by providing a device having at one end, its upper end when in the water, a block of floating material, for example of cork, wood or kapok, having extending therefrom at least one guide of predetermined length in, or on, which a support for the fish hooks may be moved, by attachment to the line from the fishing pole, between the upper and lower closed ends of the guide. In an alternative embodiment, the block of floating material and the support for the fish hooks are a single element movable on the guide upwardly by the water on immersion and downwardly by the line from the fishing pole. To the bottom face of the closed lower end a fin member is attached, the weight of the guide, support and hooks, and the fin being such that when released in a sufficiently deep water, the whole device will just float with a small portion of the upper end only breaking the surface of the water. By attaching a sinker of convenient size to the end of the fin by a predetermined length of line, the device may be sunk to a predetermined depth while maintaining the principal axis of the device substantially vertical.

The foregoing, as also other and obvious, objects and advantages of my invention are more fully set forth in the following specification read in conjunction with the accompanying drawing in which:

Figure 1 is an elevational view showing one illustrative embodiment of my invention having a single guide bar for the movable hook support;

Figure 2 is a side view of the embodiment of Figure 1, partially broken away in the central region of the guide bar;

Figure 3 is an elevational view of a second illustrative embodiment of my invention having a pair of guides for the movable hook support;

Figure 4 is an elevational front view, and Figure 4A a section along line 4A—4A of Figure 4, of a third embodiment thereof in which the float is made integral with the guide for the movable hook support; and Figure 5 is a fourth embodiment thereof having a pair of guides for the movable hook support which is also the float of this embodiment.

Like reference characters in the figures refer to identical elements in each of the embodiments.

In the embodiment shown in Figures 1 and 2, the float 1 is a block of material, such as, wood, cork or kapok, which may be shaped to simulate, for example, a fish head, and may be colored and decorated to enhance the simulation. The float is of such a volume that with all of the elements hereinafter identified attached thereto, excepting only the sinker 2, it will just float when freely released in water, with an axis of the device substantially vertical. A hollow thin walled tube 3, of an external diameter less than one surface of block 1 is fastened centrally of such face of the block and extends a distance from such surface of the order of five to eight or so inches, although this is a matter of choice. I prefer such a length that the diametrically opposite slits 4, cut longitudinally in the tube 3, extend about five inches from the surface of the body 1. Within the hollow tube is a loosely fitting disc 5 which has pivoted thereto two hook supporting arms 6, one extending through each slit 4, and each provided with a stop 7 at its pivoted end, as shown in better detail in Figures 2 and 3, which is adapted to limit the rotatable motion of the arms 6 to substantially the horizontal position from an upward position where arms 6 strike the body 1, stops 7 engaging the cylindrical surface of disc 5 when the arms are horizontal and moving away therefrom when the arms are rotated toward body 1. The other end of the tube is closed by a solid cylinder 8 provided with a pair of fins 9 extending diametrically oppositely therefrom. The solid cylinder 8 may be attached to the tube in any manner, for example by soldering, brazing or welding, or having its upper portion a force fit into the lower end of the tube, or by peening the lower end region of the tube about the upper end region of the cylinder, etc. An eyelet 10 at the lower end of cylinder 8 is for convenient attachment of the sinker 2 to the device by any predetermined length of line 11. Disc 5 is connected by a length of strong but flexible line or gut 12 passing through the interior of hollow tube 3 and aligned hole 13 in body 1 and terminating in a bead 14 which is fixed by terminating loop 15. Bead 14 is of such a size that it cannot enter hole 13 and is spaced at such a distance from disc 5 that when the latter strikes the end of solid cylinder 8, the bead 14 will rest on the top surface of body 1 with a slight slack in intermediate gut 12. If preferred, bead 14 is loosely fitted about gut 12 and thus tends to rest on body 1 at all times, in which event the bead hole through which gut 12 passes is slightly larger than the gut 12 in cross section thus preventing the passage therethrough of loop 15. The tube 3, cylinder 8, fins 9 and disc 5 are preferably of metal although they may be of plastic, while the arms 6 are of springy material such as steel. Disc 5 may be of any desired height, but I prefer to make it just high enough to be able readily to pivotally connect the arms 6 thereto, obtaining the necessary weight to assure that it constantly tends to slide down in tube 3 by making it of heavy metal, such as lead, or by weighting it sufficiently if it is otherwise too light positively to have such tendency.

In the embodiment of my device shown in Figure 3, I provide the body with a pair of guides 16 spaced from each other with upper and lower cross pieces, 17 and 18, respectively. The upper cross piece 17 is sunk completely into body 1 and has an opening registering with the opening 13 for the passage of the gut 12 therethrough, while the lower cross piece 18 has the aligned fins 9 attached to a central projection 19 integral with cross piece 18. Eyelet 10 is attached to the lower end of projection 19 for attaching line 11 and sinker 2. Disc 20 is provided with a pair of perforations 21 registering with guides 16 and a loose fit thereover, while the gut 12 is connected to the disc by eyelet 22. I prefer to make the disc 20 of minimum height so that there will be a minimum of binding action between the lengths of the walls of perforations 21 and guides 16 as the disc experiences lateral thrusts while being moved along the guides. The lengths of the guides 16 are of the same order substantially as the length of tube 3 of Figure 1. The fish hooks 23, provided with artificial bait 24 if desired, are attached to the free ends of the arms 6 by lengths of line preferably not longer than a maximum of twice the length of arm 6.

In the embodiment of Figure 4 and 4A, the float body is made integral with the guide tube, the unitary element 32 being of wood and shaped, for example, as a fish including colored pins 33 to simulate the eyes. To provide the guide in which the disc 5 is slidable, a hole 34 is drilled through the tail end of the fish body axially the length of element 32 of the predetermined amount but not through the head end, and the diametrically opposite slits 35, through which the two hook supporting arms 6 extend, are cut longitudinally from the tail end by a band saw. The disc 5 having been inserted into the drilled bore with the line 36 attached to its upper face, and the upper end of the line having been threaded through an axial aperture 37 through the head end of element 32 and knotted in a loop 38, a wooden plug 39 is fixed in the open end of the bore 34, for example by a pair of nuts and screws 40, and the extending end or lower face of the plug is provided with an eyelet 41 to which the sinker line 11 is attached.

Referring to the embodiment shown in Figure 5, the guides 16, as in Figure 3, are spaced by an upper cross piece 17 and a lower cross piece 18, and while the upper cross piece is herein not embedded in any float or body, it does have the central opening as before for passing gut 12 therethrough. On the guides there is herein disposed the cylinder 25 of cork, wood or kapok, and which has a pair of perforations 26 for the guides 16 and also a central perforation 27 through which the gut 12 passes. As in the structure of Figure 3, the lower cross piece 18 is provided with the central projection 19, the aligned pair of fins 9 and the eyelet 10, and is in addition provided with an integral loop 28 through which the gut 12 passes and is connected as at 29 to the lower face of the cylinder 25. At or near its upper surface, cylinder 25 carries the pivoted hook supports 6 with integral stops 7. As in the case of body 1 in the embodiment of Figure 1, as also of Figure 3, so now the cylinder 25 is of such a density that when freely released in water, the embodiment of Figure 5 will just float with its longitudinal axis substantially vertical. In this embodiment it will be noted that even when the device is submerged, the tendency of the hook support cylinder 25 is now always to be against the upper cross piece 17, and only when the loop 15 and gut 12 is pulled upward is the cylinder 25 pulled down along the guides 16.

When not in use, the arms 6 of the embodiments of my tackle are folded against the guide means, that is tube 3 or guides 16, and the fish hooks 23 are embedded in the body 1, respectively in cylinder 25 in the Figure 5 embodiment. With the hook support, that is the disc 5 in Figure 1, the disc 20 in Figure 3, and the cylinder 25 in Figure 5, depressed to the lower end, a compact and convenient parcel is formed of the device, and the line 11 may be wrapped around the guide means and the arms folded thereon.

In use, the desired spacing of the tackle above the bed 30 of the river, lake, etc., having been determined, an appropriate length of sinker line 11 is used to attach the sinker to the eyelet 10 of the tackle, the hooks removed from their embedded position in body 1, respectively cylinder 25, the arms 6 folded downwardly to their horizontal position, and the loop 15 is attached to the line 31 from the fishing pole (not shown). When the sinker 2 is felt by the fisherman to have struck bottom, no more line 31 is played out from the pole, and the pole is now dipped continuously through a relatively small arc, for example by reciprocation of the fisherman's wrist vertically. In this manner the discs 5 and 20, respectively of Figures 1, 4 and 3 and the cylinder 25 of Figure 5, may be reciprocated between the upper and lower ends of the guide means without disturbing the sinker 2, which, if disturbed, would muddy up the water and tend to prevent the fish from seeing the moving bait and might also produce noises as rocks, etc., are struck thereby. I have noticed that in drop fishing the fins 9 apparently impart a slowly rotating motion to my tackle due to the currents in the water being fished. Thus in drop fishing with my device, the bait is both reciprocated and rotated in water which is not more stirred up than the remainder of the body of water being fished.

With the fishing tackle of my invention I have found that it is very conveniently used for trolling, for which the sinker 2 and the sinker line 11 are generally unnecessary although at times a light sinker may be attached with a short connecting line. In trolling, the fins 9 act as a rudder and prevent the rotation of the tackle and consequent snagging of the respective hooks from the pair of supporting arms 6.

It will be understood that the embodiments of my invention herein described are but illustrative and that various modifications may be made therein without departing from the spirit and scope of my invention.

I claim:

1. A fishing apparatus comprising a first line, a float, a hollow tube extending from one face of the float, the hollow tube having a pair of slots of a predetermined length formed therein intermediate its ends at two diametrically opposite regions, a disc slidable within the tube, a plurality of spring arms pivoted to the disc and extending respectively through the apertured tube regions, a stop integral with each arm to limit the pivotal motion thereof so that the pivoted arm occupies a substantially horizontal position, a fish hook connected to the free end of each arm, a sinker, means for connecting the sinker to the bottom end region of the tube, and a second line connecting the disc to the first line, the float being of such a density that the apparatus without the sinker will float with the tube in a substantially vertical positiion.

2. A fishing apparatus according to claim 1 in which the lower end region of the tube is provided with a pair of diametrically opposite fins and the second line passes through the interior of the tube and the float and includes a stop which strikes the float when the disc is in its lowermost position within the tube.

3. Fishing apparatus comprising a line, a float, guide means extending from the float, a slidable support cooperating with the guide means, an arm extending laterally of the line from the support, a fish hook connected to the arm, and a sinker attached to the lower end of the guide means, the line being connected to the slidable support whereby the support may be reciprocated by the line relative to the guide means while the sinker remains stationary on the bed of the body of water being fished.

4. Fishing apparatus comprising a line, a float, a guide means extending from the bottom of the float, a stop on the guide means at a lower portion thereof, a support slidable relative to the guide means, an arm pivoted to a peripheral region of the support and adapted to be pivoted from substantially a vertical position to a substantially horizontal position, a fish hook connected to the arm, means within the guide means and extending through the float connecting the support to the fisherman's line, and a stop about the connecting means above the upper face of the float and engaging the upper face of the float when the support is in its lowermost position against the guide means stop, and a sinker connected to the lower end of the guide means.

5. Fishing apparatus comprising a fisherman's line, a float, a guide means extending from the bottom of the float, a stop on the guide means at a lower portion thereof, a support slidable relative to the guide means, an arm pivoted to a peripheral region of the support and adapted to be pivoted from substantially a vertical position to substantially a horizontal position, a fish hook connected to the free end region of the arm, means within the guide means connected at one end to the support and extending through the float with its other end connectable to a fisherman's line, a stop about the connecting means above the upper face of the float and engaging the upper float face when the support is in its lowermost position against the guide means stop, a sinker, and a line of variable but predetermined length of which one end is connected to the sinker and the other end is connected to the lower end of the guide means.

6. Fishing apparatus comprising a fisherman's line, a float, a pair of spaced rods extending from the bottom of the float, a crosspiece interconnecting the lower ends of the rods, a disc having a pair of apertures through each of which a rod of the pair slidably extends, an arm pivoted to a peripheral region of the disc, a fish hook connected to the free region of the arm, a section of the line having its lower end connected to the disc and extending freely through the float with its other end adapted to be connected to a fisherman's line, a stop about the section of line engaging the upper face of the float when the disc is in its lowermost position against the crosspiece, a sinker and a second section of line of predetermined but variable length of which the one end is connected to the crosspiece and the other end to the sinker.

7. Fishing apparatus comprising a fisherman's line, a float, a hollow cylindrical tube element extending from the bottom of the float having a pair of diametrically opposite longitudinal slots in its cylindrical wall, a plug fitted into the lower end region of the tube element, a support slidably fitted into the hollow interior of the tube element and of a height relatively small compared to the length of the slots of the pair, an arm pivoted to a peripheral region of the support registering with each slot of the pair and adapted to be pivoted from substantially a vertical position above the support to a substantially horizontal position, a fish hook connected to the free end of the arm, said float having a longitudinal aperture therethrough substantially coaxial with the tube element, a flexible connection connected to the support and passing through the aperture for connecting the support to a fisherman's line, a stop means in the flexible connection above the upper face of the float adapted to engage the upper face of the float when the support is in its lowermost position against the plug, and a sinker connected to the lower end region of the plug.

8. Fishing apparatus comprising a fisherman's line, a float, a pair of spaced rods extending from the lower face of the float, a cross-piece interconnecting the extending remote ends of the rods, a disc slidable on the rods between the lower face of the float and the cross-piece, a spring arm extending from the disc substantially horizontally between the rods, a fish hook connected to the arm, the float being of such a density and configuration that the assembled float, rods, disc, cross-piece, arm and fish hook will float on immersion with its rods substantially vertical, a flexible connection from the disc between the rods and through the float for connection to the fisherman's line, a stop on the flexible connection above the upper surface of the float adapted to engage the float upper surface when the disc is against the cross-piece, an extension extending centrally from the cross-piece in the direction opposite to the pair of rods, the extension being provided with a pair of fins diametrically opposite each other, and a sinker connected to the lower central end region of the extension.

9. Fishing apparatus comprising a fisherman's line, a float, a pair of spaced rods, an upper cross-piece connecting the upper end regions of the rods, a lower cross-piece interconnecting the lower end regions of the rods, the float being slidable on the rods between the cross-pieces, an arm pivoted to the float, a fish hook connected to the free end region of the arm, a stop integral with the arm and adapted to strike the periphery of the float when the arm is pivoted to the horizontal position, the float being of such a density and configuration that the assembled rods, cross-pieces, float, arm and fish hook will on immersion float with the rods substantially vertical, a line connected to the bottom of the float, an eyelet integral with the lower cross-piece and central of its upper face, the float and the upper cross-piece being apertured in alignment with the eyelet to permit of the line passing successively through the eyelet, the float and the upper cross-piece, for connection beyond the upper cross-piece to the fisherman's line.

10. Fishing apparatus comprising a line, a float, a guide means extending from the lower surface of the float, a support mounted on and slidable relative to the guide means intermediate the ends of the guide means, an arm extending from the support laterally of the line, and a sinker attached to the lower end of the guide means, the line being connected to the slidable support whereby the support may be reciprocated between the guide means ends while the sinker remains stationary on the bed of the body of water being fished.

References Cited in the file of this patent

UNITED STATES PATENTS

| | | |
|---|---|---|
| 236,750 | Andrew | Jan. 18, 1881 |
| 720,643 | Wallace | Feb. 17, 1903 |
| 1,816,235 | Schroeder | July 28, 1931 |
| 2,157,003 | Mussina | May 2, 1939 |
| 2,289,663 | Linhares | July 14, 1942 |